UNITED STATES PATENT OFFICE.

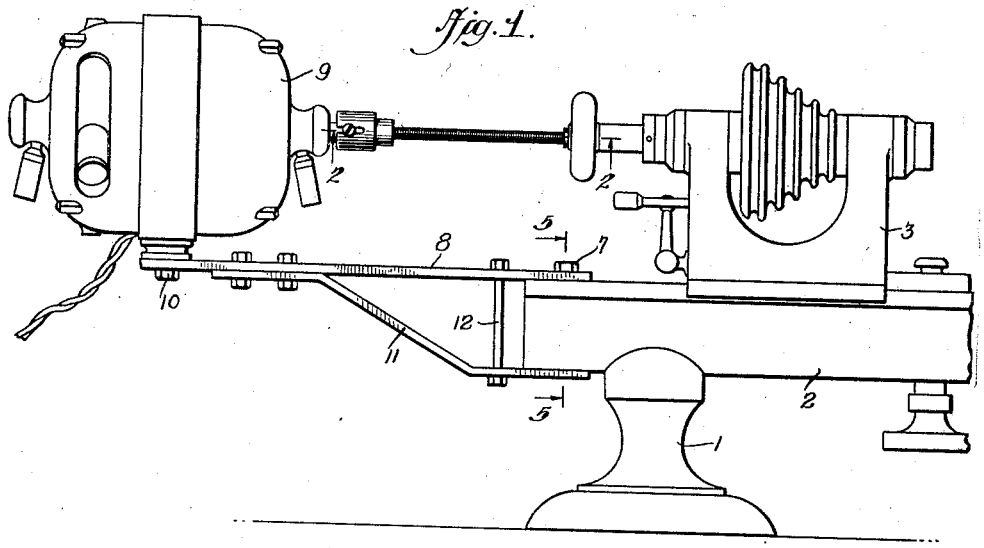
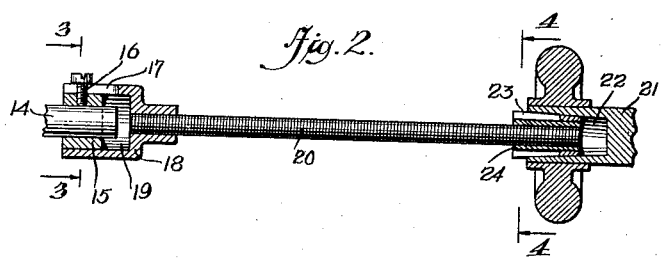
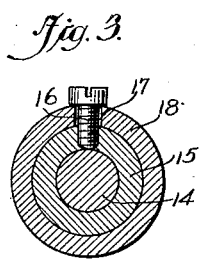
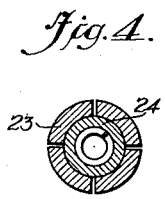
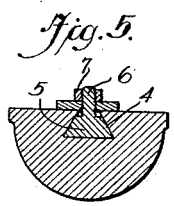

JAMES V. DILLEY, OF DETROIT, MICHIGAN.

LATHE ATTACHMENT.

1,427,076.  Specification of Letters Patent.  Patented Aug. 22, 1922.

Application filed April 14, 1921. Serial No. 461,250.

*To all whom it may concern:*

Be it known that I, JAMES V. DILLEY, a citizen of the United States, and a resident of Detroit, in the county of Wayne and State of Michigan, have invented a new and Improved Lathe Attachment, of which the following is a full, clear, and exact description.

This invention relates to lathe connections and has particular reference to lathes used in connection with the manufacture and repair of watches and jewelry.

An object of the invention is to provide a simple and strong bracket upon which to support small motors to run the lathe, and which can be very easily attached to the lathe frame very rigidly, so as to support the motor without vibration.

Another object resides in the provision of a connection between the motor and the lathe spindle which permits of the ready adjustment and movement of the lathe without the liability of the connection being jammed or getting off center.

A further object resides in the provision of means whereby all belting is eliminated, the lathe is made portable, and the lathe and its motor are balanced so that they can be used anywhere.

A still further object resides in the provision of means whereby the motor and the lathe can be instantly assembled and disassembled.

Another object resides in the provision of means whereby there is no tendency to create side pressure, to slip, to non-uniform speed of the motor, and whereby marring of the table or support on which the lathe may be mounted is avoided.

The invention is illustrated in the drawings, of which—

Figure 1 represents a side view of the apparatus;

Figure 2 is a longitudinal section through the connection shaft;

Figure 3 is a transverse vertical section taken on the line 3—3 of Figure 2;

Figure 4 is a transverse vertical section taken on the line 4—4 of Figure 2; and Figure 5 is a section taken on the line 5—5 of Figure 1.

As shown in the drawings, the invention is adapted to be used in connection with a lathe which is mounted on a base or pedestal 1, and is provided with a bed 2, on which the head stock 3 is slidably mounted in the usual manner. The upper surface of the bed is provided with a longitudinal slot 4 in which the head stock slides. This slot 4 is tapered and receives a similarly-shaped bolthead 5 having a shank 6 on which a thumb nut 7 is threaded. Between the nut 7 and the upper surface of the table 2 there is received the end of a bracket plate 8. This plate extends horizontally outwardly and on its other end receives a small portable motor 9 which may be fastened to the end of plate 8 in any suitable manner, such as by the screw 10. A reinforcing plate 11 is at one end attached to the plate 8 and then bends downwardly to engage with the under surface of the bed 2. A stay or spacing bolt 12 extends rigidly between the plate 8 and the plate 11 adjacent the bed 2.

The motor 9 is provided with a shaft 14 on the end of which a sleeve 15 is held by means of a set screw 16. The set screw 16 is of sufficient length to be received in a slot 17 in a connecting head 18 which is bored as at 19 to receive the end of the shaft 14 and the sleeve 15. One end of a flexible shaft or connection 20 is received by the head 18. This flexible shaft may be of any suitable type and length but is long enough to permit of the movement of the head stock a considerable distance on the bed 2.

The other end of the flexible shaft 20 is connected to the spindle 21 on the head stock 3. This spindle is bored out tapered as at 22. A split sleeve 23 of rubber or other insulating material is inserted into the bore 22. This split sleeve surrounds a brass ferrule 24. This ferrule embraces the end 25 of the flexible shaft 20. By jamming or forcing the ferrule 24 and the split sleeve 23 into the bore 22, the end of the flexible shaft 20 is firmly gripped. The engagement of the set screw 16 in the slot 17 drives the flexible shaft 20 positively from the motor 9 and yet permits the shaft to center itself without any side thrust or vibration on the other parts of the apparatus. By eliminating all side pressure, the shaft floats in the bearings, and the greater the speed, the greater the tendency to dead center. This dispenses with the use of expensive drills and also reduces the time required for pivoting by fifty per cent.

It will be seen that I have provided a simple, compact apparatus which can be instantly assembled and disassembled, which is rigidly attached to the frame of any device, such as a lathe, and which operates with a minimum of disturbance by vibration of the rest of the parts of the apparatus.

Minor modifications may be made in the construction and arrangement of the apparatus without departing from the spirit of the invention.

What I claim is:

1. A lathe bed having a slot therein, a motor, a bracket to support the motor, and an adjusting means on the end of the bracket to engage in the slot and a portion of the bracket engaging beneath the edge of the bed.

2. A motor-supporting bracket, a lathe bed having a slot therein, said bracket comprising a horizontally extending plate, an adjusting means on the end of said plate and engaging in the slot to fasten the plate to the bed, a second downwardly extending plate on the bracket to engage beneath the edge of the bed, and a spacing bolt extending between the plates adjacent the bed.

3. An attachment for lathes which have a head stock, a supporting table and a slot in the bed, which comprises a bracket, means on one end of the bracket to engage in the slot to fasten the bracket to the bed, a motor support on the other end of said bracket, and a flexible shaft extending from the motor to the head stock of the lathe.

4. An attachment for lathes which have a supporting bed and a head stock mounted thereon, which comprises a bracket removably attached to the bed, a motor on said bracket, and a flexible shaft frictionally and operatively connected to the head stock at one end and loosely connected to the shaft of the motor at the other end.

5. An attachment for lathes having a supporting bed and a headstock mounted thereon, which comprises a bracket removably attached to the bed, a motor mounted on the end of said bracket, and a flexible shaft extending between the headstock and the motor, said shaft frictionally engaging at one end and loosely engaged at the other.

6. An attachment for lathes having a supporting bed and a headstock mounted thereon, which comprises a bracket extending beyond the bed and removably attached thereto, a motor supported on said bracket, and a flexible shafting extending between the motor and the headstock.

JAMES V. DILLEY.